United States Patent [19]

Akiyama et al.

[11] Patent Number: 5,346,375
[45] Date of Patent: Sep. 13, 1994

[54] DELIVERY VALVE FOR A SCROLL COMPRESSOR

[75] Inventors: Kazuyuki Akiyama; Yoshinori Shirafuji; Keiju Sakaino, all of Tokyo, Japan

[73] Assignee: Mitsubishi Denki Kabushiki Kaisha, Tokyo, Japan

[21] Appl. No.: 980,183

[22] Filed: Nov. 23, 1992

[30] Foreign Application Priority Data

Dec. 11, 1991 [JP] Japan .................. 3-350398

[51] Int. Cl.⁵ .................. F04C 18/04; F04C 29/00; F16K 15/14
[52] U.S. Cl. .................. 418/15; 418/55.1; 418/270; 137/512; 137/853; 137/855
[58] Field of Search .......... 418/15, 55.1, 270; 137/512, 852, 853, 855

[56] References Cited

U.S. PATENT DOCUMENTS

| 4,389,171 | 6/1983 | Eber et al. ............ 418/55.1 |
| 4,668,172 | 5/1987 | Shibuya et al. ........ 418/270 |
| 4,764,099 | 8/1988 | Nakajima et al. ...... 418/270 |
| 4,818,195 | 4/1989 | Murayama et al. ..... 418/55.1 |

FOREIGN PATENT DOCUMENTS

| 58-128485 | 8/1983 | Japan ............ 418/15 |
| 1142290 | 6/1989 | Japan ............ 418/270 |
| 3242483 | 10/1991 | Japan ............ 418/55.1 |

OTHER PUBLICATIONS

Patent Abstracts of Japan 63-138185, Jun. 10, 1988, M. Tanizaki, et al., "Scroll Type Compressor".
Patent Abstracts of Japan, 3-121286, May 23, 1991, J. Saito, "Discharge Apparatus of Scroll Compressor".

Primary Examiner—John J. Vrablik
Attorney, Agent, or Firm—Oblon, Spivak, McClelland, Maier & Neustadt

[57] ABSTRACT

A discharge valve is incorporated into a scroll compressor for use in a refrigerator or an air conditioner. A valve element seating surface having a concave cylindrical shape is formed in the upper surface of the stationary disk of the stationary scroll plate of the scroll compressor, a discharge port is formed through the stationary disk of the stationary scroll plate so as to open in the valve element seating surface, and a discharge valve element having a cylindrical shape conforming to the concave cylindrical shape of the valve element seating surface is seated on the valve element seating surface so as to open or close the discharge port. The valve element seating surface having a concave cylindrical shape facilitates machining the stationary scroll plate, reduces the top clearance of the scroll compressor without reducing the rigidity of the stationary disk, prevents the concentration of stress on the delivery valve, and improves the reliability of the delivery valve.

10 Claims, 5 Drawing Sheets

F I G. 2
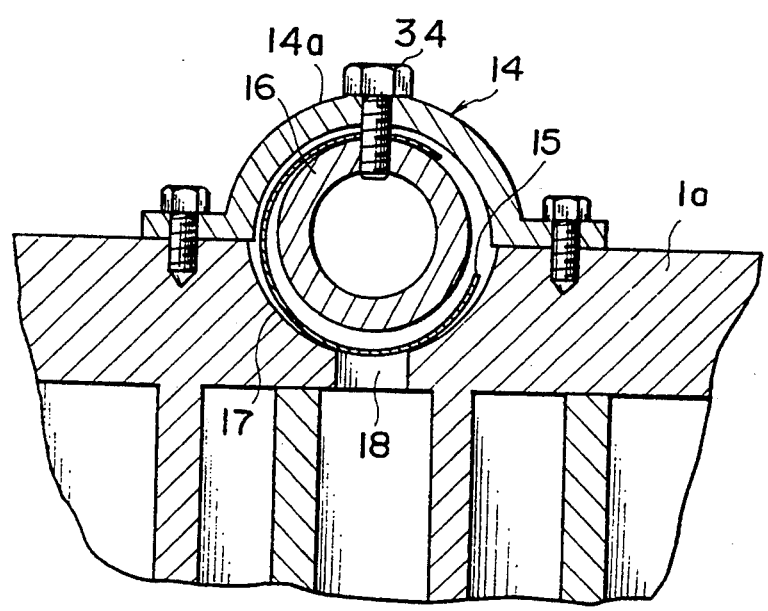
F I G. 3
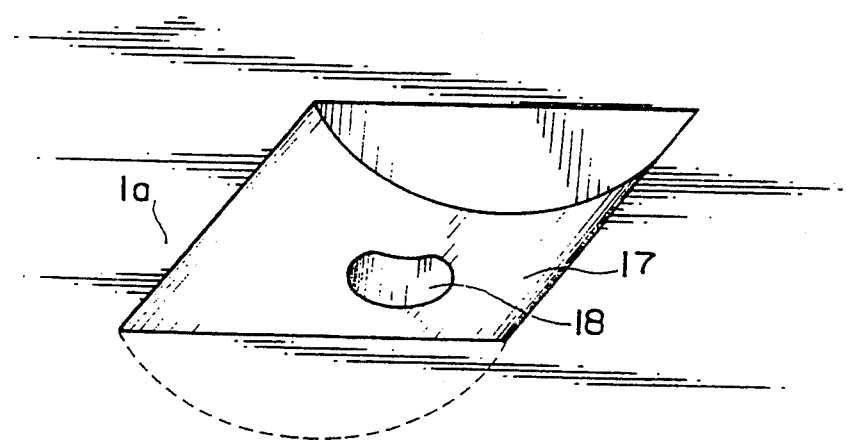

DELIVERY VALVE FOR A SCROLL COMPRESSOR

BACKGROUND OF THE INVENTION

1. Field of the Invention

The present invention relates to a delivery valve to deliver compressed refrigerant from a scroll compressor incorporated into a refrigerator or an air conditioner.

2. Description of the Prior Art

FIG. 5 is a sectional view of a prior art scroll compressor disclosed in, for example, Japanese Patent Laid-open (Kokai) No. Hei 2-163486 and FIG. 6 is an enlarged sectional view of a portion of FIG. 5.

This prior art scroll compressor has a stationary scroll plate 1 and a revolving scroll plate 2. The stationary scroll plate 1 is fastened closely to the surface of an upper wall of a closed vessel 10 so as to partition the interior of the closed vessel 10 into a high-pressure chamber VH and a low-pressure chamber VL.

The stationary scroll plate 1 has a stationary disk 1a, a circumferential annular wall 1b having the shape of a skirt and formed integrally with the stationary disk 1a, and a scroll wrap 1c protruding from the lower surface of the stationary disk 1a and formed integrally with the stationary disk 1a. The revolving scroll plate 2 has a revolving disk 2a, a scroll wrap 2b protruding from the upper surface of the revolving disk 2a and formed integrally with the revolving disk 2a, and a pin 2c projecting downward from the center of the lower surface of the revolving disk 2a. The stationary scroll plate 1 and the revolving scroll plate 2 are combined so that the scroll wraps 1c and 2b engage.

When the stationary scroll plate 1 and the revolving scroll plate 2 are thus combined, a first compression chamber, i.e., an innermost compression chamber, a second compression chamber on the outside of the first compression chamber, and a third compression chamber on the outside of the second compression chamber, i.e., an outermost compression chamber, are formed between the scroll wraps 1c and 2b. The revolving scroll plate 2 is supported by an Oldham ring 5 on a main frame 6. The main frame 6 is disposed fixedly in an upper portion of the internal space of the closed vessel 10 at a position under the revolving scroll plate 2. A secondary frame 9 is disposed fixedly in a lower portion of the internal space of the closed vessel 10. A crankshaft 4 is supported for rotation in bearings 31 and 32 on the main frame 6 and the secondary frame 9.

A hole 4a is formed in the upper end of the crankshaft 4. The hole 4a is eccentric with respect to the axis of the crankshaft 4. The pin 2c of the revolving scroll plate 2 is fitted in the hole 4a.

An axial lubricating oil hole 4b is formed through the crankshaft 4 along the axis of the same. The lubricating oil hole 4b an upper end opening into the hole 4a and a lower end opening into lubricating oil 13 contained in the bottom of the closed vessel 10.

The crankshaft 4 is driven for rotation by an electric motor having a stator 7 and a rotor 8 fastened to the crankshaft 4 by shrink fit.

An inlet pipe 11 is connected to a lower portion of the circumferential wall of the closed vessel 10 to supply a refrigerant from an external refrigeration cycle into the low-pressure chamber VL. A delivery pipe 12 is connected to the top cover of the closed vessel 10 to deliver the compressed refrigerant gas from the high-pressure chamber VH.

The stationary scroll plate 1 of the prior art scroll compressor thus constructed is provided with a delivery reed valve having a discharge valve element 25 for closing or opening a discharge port 28 formed in the central portion of the stationary disk 1a. The discharge port 28 opens into a recess 24 formed in the central portion of the upper surface of the stationary disk 1a of the stationary scroll plate 1. The discharge valve element 25 is received in the recess 24. The bottom surface of the recess 24 is inclined at a predetermined angle to form a valve element seating surface 27 on which the discharge valve element of the reed delivery valve is seated. The lift of the discharge valve element 25 is limited by a valve holding member 26. The valve holding member 26 is fastened to the valve element seating surface 27 together with the discharge valve element 25.

When the crankshaft 4 is driven for rotation by the electric motor, the torque of the crankshaft 4 is transmitted to the revolving scroll plate 2 to revolve the revolving scroll plate 2 along a circular path by the agency of the Oldham ring 5. Consequently, the volume of the space formed between the scroll wrap 1c of the stationary scroll plate 1 and the scroll wrap 2b of the revolving scroll plate 2 varies to compress the refrigerant. The refrigerant delivered from the external refrigeration cycle flows through the inlet pipe 11 into the closed vessel 10, and then the refrigerant is compressed sequentially in the compression chambers formed between the scroll wrap 1c of the stationary scroll plate 1 and the scroll wrap 2b of the revolving scroll plate 2.

When the refrigerant is compressed by the compressing action to a pressure higher than a pressure on the high-pressure side of the external refrigeration cycle, the the discharge valve element 25 is lifted up by the pressure of the refrigerant and the compressed refrigerant flows through the discharge port 28 into the high-pressure chamber VH. All the refrigerant sucked into the compression chambers is not discharged from the compression chambers and part of the refrigerant sucked into the compression chambers remains in the compression chambers because the delivery valve closes upon the equilibration of the pressure of the refrigerant in the compression chamber and the pressure of the same on the high-pressure side of the external refrigeration cycle. The refrigerant thus discharged into the high-pressure chamber VH of the closed vessel 10 flows through the delivery pipe 12 to the external refrigeration cycle.

The sum of the volume of the first compression chamber, i.e., the innermost compression chamber, immediately before the communication of the first compression chamber and the adjacent second compression chamber and the volume of the discharge port 28 is designated as top clearance. The top clearance must be small to reduce reexpansion loss that occurs immediately after the communication of the first compression chamber with the second compression chamber. The volume of the discharge port 28 which does not contribute to compression must be reduced to the least possible extent to reduce the reexpansion loss. In this specification, the only volume of the discharge port 28 will be referred to as top clearance. The recess 24 is formed in the central portion of the upper surface of the stationary disk 1a to reduce the top clearance. The recess 24 must have a considerably large sectional area corresponding to that of the discharge valve element 25.

Since the prior art scroll compressor is thus constructed, the top clearance of the discharge port 28 needs to be reduced by increasing the depth of the recess 24 to reduce recompression loss in the discharge cycle. However, increase in the depth of the recess 24 reduces the strength and rigidity of the stationary disk 1a. Therefore, there is a limit to the reduction of the top clearance by increasing the depth of the recess 24.

Furthermore, since the recess 24 having the valve element seating surface 27 inclined at a predetermined angle has a complicated shape, it is difficult to machine the stationary disk 1a with an end mill to form the recess 24 and hence the machining cost increases.

SUMMARY OF THE INVENTION

Accordingly, it is a first object of the present invention to provide a delivery valve having high reliability and efficiency for a scroll compressor, facilitating the machining of the stationary scroll plate of the scroll compressor, enabling the reduction of the top clearance without reducing the rigidity of the stationary scroll plate.

A second object of the present invention is to provide a delivery valve for a scroll compressor, capable of preventing the scroll wraps of the stationary scroll plate and the revolving scroll plate of the scroll compressor forming a spiral compression chamber being broken by the liquid refrigerant.

To achieve the first object of the invention, the present invention provides a delivery valve in a first aspect of the present invention for a scroll compressor provided with a stationary scroll plate provided with a scroll wrap, and a revolving scroll plate provided with a scroll wrap and disposed so that the scroll wrap of the stationary scroll plate and that of the revolving scroll plate engage, said delivery valve comprising the stationary disk of the stationary scroll plate, provided with a valve element seating surface formed in the upper surface thereof, and a discharge port formed therethrough so as to open in the valve element seating surface, a discharge valve element for opening or closing the discharge port, seated on the valve element seating surface of the stationary disk of the stationary scroll plate, and a valve element holding member holding the discharge valve element and limiting the lift of the discharge valve element, wherein the valve element seating surface has a concave cylindrical shape, and the discharge valve element has a cylindrical shape conforming to the concave cylindrical shape of the valve element seating surface.

To achieve the second object of the invention, the stationary scroll plate of the delivery valve in the first aspect of the present invention is provided with relief holes in the concave cylindrical valve element seating surface to allow the liquid refrigerant to escape, and the relief holes are opened or closed by relief valve elements.

Since the valve element seating surface of the delivery valve in accordance with the present invention for a scroll compressor has a concave cylindrical shape, the sectional area of the opening is relatively small. Accordingly, recompression loss can be reduced by reducing the top clearance without reducing the rigidity of the stationary scroll plate. The concave cylindrical valve element seating surface can be formed in a short time by cutting the stationary scroll plate with a cylindrical cutter and hence the stationary scroll plate can be formed at a reduced cost.

Furthermore, when the internal pressure of the compression chamber of the delivery valve in accordance with the present invention for a scroll compressor exceeds a specified pressure, the relief valve elements are separated from the relief holes by the internal pressure to allow the liquid refrigerant to escape from the compression chamber, so that the breakage of the scroll wraps by the pressure of the liquid refrigerant can be prevented.

The above and other objects, features and advantages of the present invention will become more apparent from the following description taken in connection with the accompanying drawings. However, these drawings are intended to illustrate the invention and are not to be construed to limit the scope of the invention.

BRIEF DESCRIPTION OF THE DRAWINGS

FIG. 2 is an enlarged, fragmentary sectional view of an essential portion of the delivery valve of FIG. 1;

FIG. 3 is a perspective view of a portion of FIG. 2;

DETAILED DESCRIPTION OF THE PREFERRED EMBODIMENTS

Preferred embodiments of the present invention will be described hereinafter with reference to the accompanying drawings.

Figure 1:
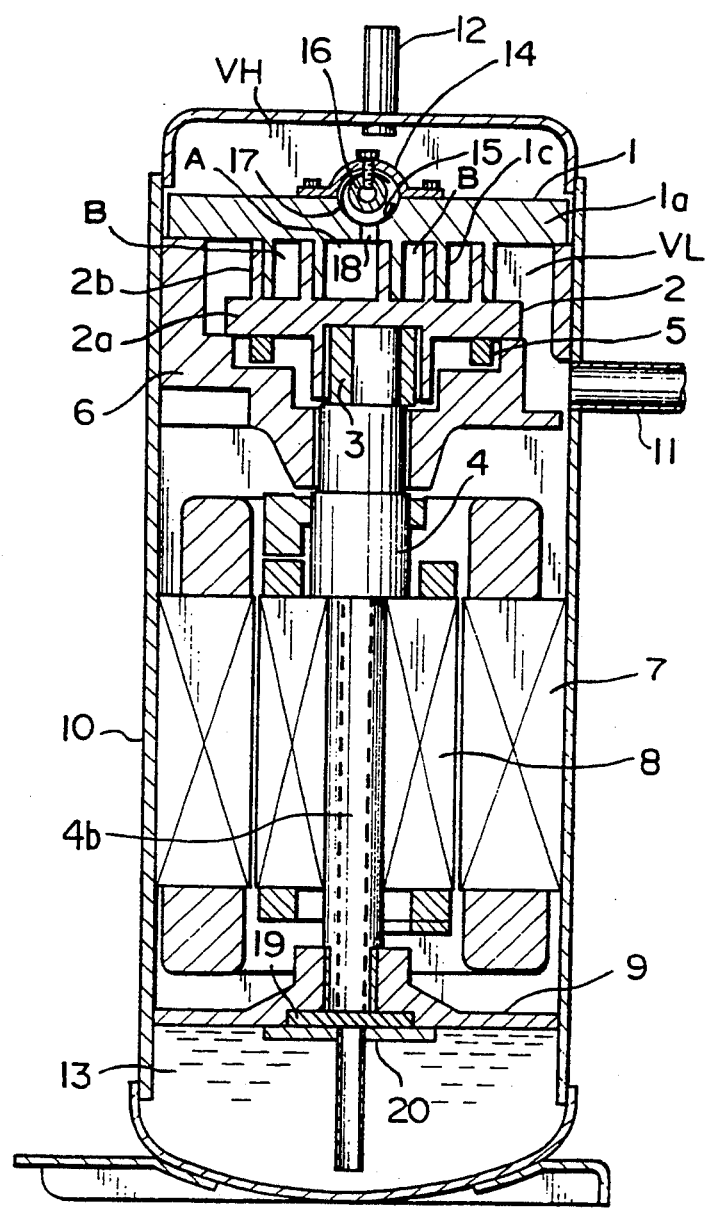
FIG. 1 is a longitudinal sectional view of a scroll compressor incorporating a delivery valve in a first embodiment according to the present invention.

Referring to FIGS. 1 to 3, a concave cylindrical valve element seating surface 17 is formed in the central portion of the upper surface of the stationary disk 1a of a stationary scroll plate 1. A discharge port 18 formed through the stationary disk 1a has one end opening in a bottom portion of the valve element seating surface 17 and the other end opening in a first compression chamber A. The first compression chamber A is the innermost compression chamber among those formed between the scroll wrap 1c of the stationary scroll plate 1 and the scroll wrap 2b of an revolving scroll plate 2.

An elastic discharge valve element 15 for opening or closing the discharge port 18 is seated on the valve element seating surface 17. The discharge valve element 15 is formed by curving, for example, a plate spring in a circular shape conforming to the shape of the valve element seating surface 17. The lift of the discharge valve element 15 is limited by a valve element holding member 16. The valve element holding member 16 is, for example, a round pipe or a round rod having a diameter suitable for holding the discharge valve element 15 in close contact with the valve element seating surface 17.

As shown in FIG. 2, the discharge valve element 15 is fastened, together with the valve element-holding member 16, to a cover member 14 covering the valve element seating surface 17 and having a circular inner circumference 14a with a screw 34. The diameter of the valve element holding member 16 is smaller than that of the circularly curved discharge valve element 15. The discharge valve element 15 is held between the circular inner circumference 14a of the cover member 14 and the valve element holding member 16 to form a valve unit. The valve unit consisting of the discharge valve element 15, the valve element holding member 16 and the cover member 14 is fastened to the stationary disk 1a with screws. In this state, the discharge valve element 15 is pressed resiliently against the valve element seating surface 17 to close the discharge port 18.

Figure 5:
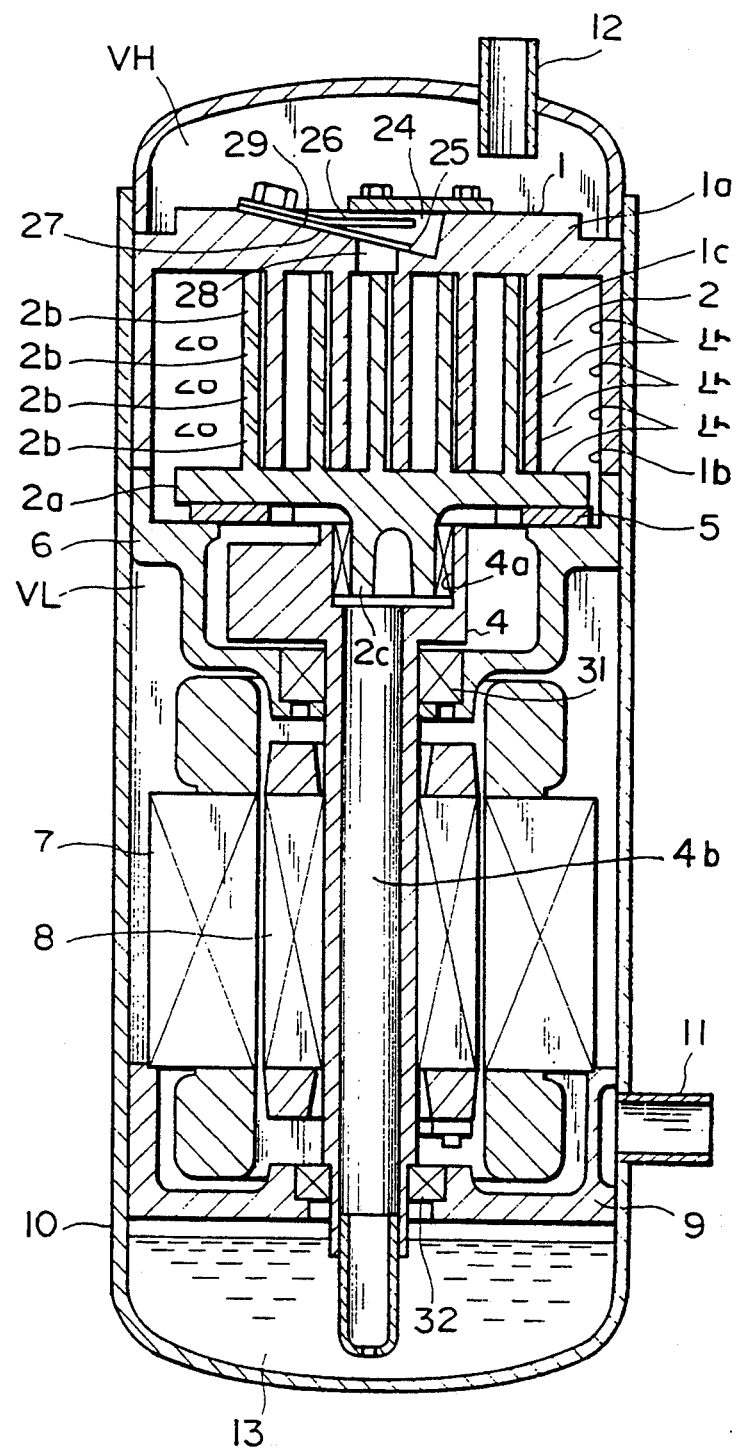
FIG. 5 is a longitudinal sectional view of a scroll compressor incorporating a prior art delivery valve.

An oil pump 19 for supplying lubricating oil 13 into an axial oil passage 4b formed through a crankshaft 4 for driving the revolving scroll plate 2 for eccentric revolution is connected to the lower end of the crankshaft 4. The oil pump 19 is immersed in the lubricating oil 13. Reference numeral 20 indicates a pump cover. Other parts of the scroll compressor and the arrangement of the other parts are the same as those of the scroll compressor shown in FIG. 5 and hence the description thereof will be omitted.

Figure 6:
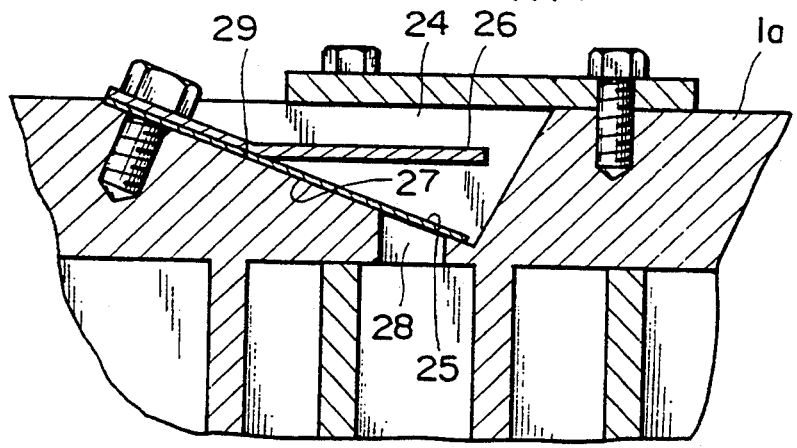
FIG. 6 is an enlarged, fragmentary sectional view of a portion of FIG. 5.

The operation and functions of the scroll compressor incorporating the delivery valve in the first embodiment will be described hereinafter. The description of the functions of the scroll compressor similar to those of the prior art scroll compressor shown in FIGS. 5 and 6 will be omitted to avoid duplication.

When the pressure in the first compression chamber, i.e., the innermost compression chamber among compression chambers formed between the stationary scroll plate 1 and the revolving scroll plate 2, exceeds the pressure on the high-pressure side of an associated external refrigeration cycle during the compression cycle, the pressure of the compressed refrigerant gas acts through the discharge port 18 on the discharge valve element 15 to push up the discharge valve element 15. The lift of the discharge valve element 15 is limited to the sum of the difference between the radius of an imaginary circle corresponding to the cross section of the valve element holding member 16 and the radius of an imaginary circle corresponding to the cross section of the discharge valve element 15, and the distance between the respective centers of the imaginary circles. Thus, the compressed refrigerant gas flows from the first compression chamber through the discharge port 18 into a high-pressure chamber VH formed over the stationary disk 1a.

In the final stage of the compression cycle, the volume of the compression chamber reaches its minimum. The sum of the minimum volume of the compression chamber and the top clearance of the discharge port 18 is a dead volume. Since the valve element seating surface 17 has the shape of a concave cylindrical shape, the sectional area of the opening is relatively small and hence the rigidity of the stationary disk 1a is not reduced. Thus, the top clearance and the dead volume are small and thereby the compression loss is reduced, loss is small and the reliability of the delivery valve is high.

Figure 4:
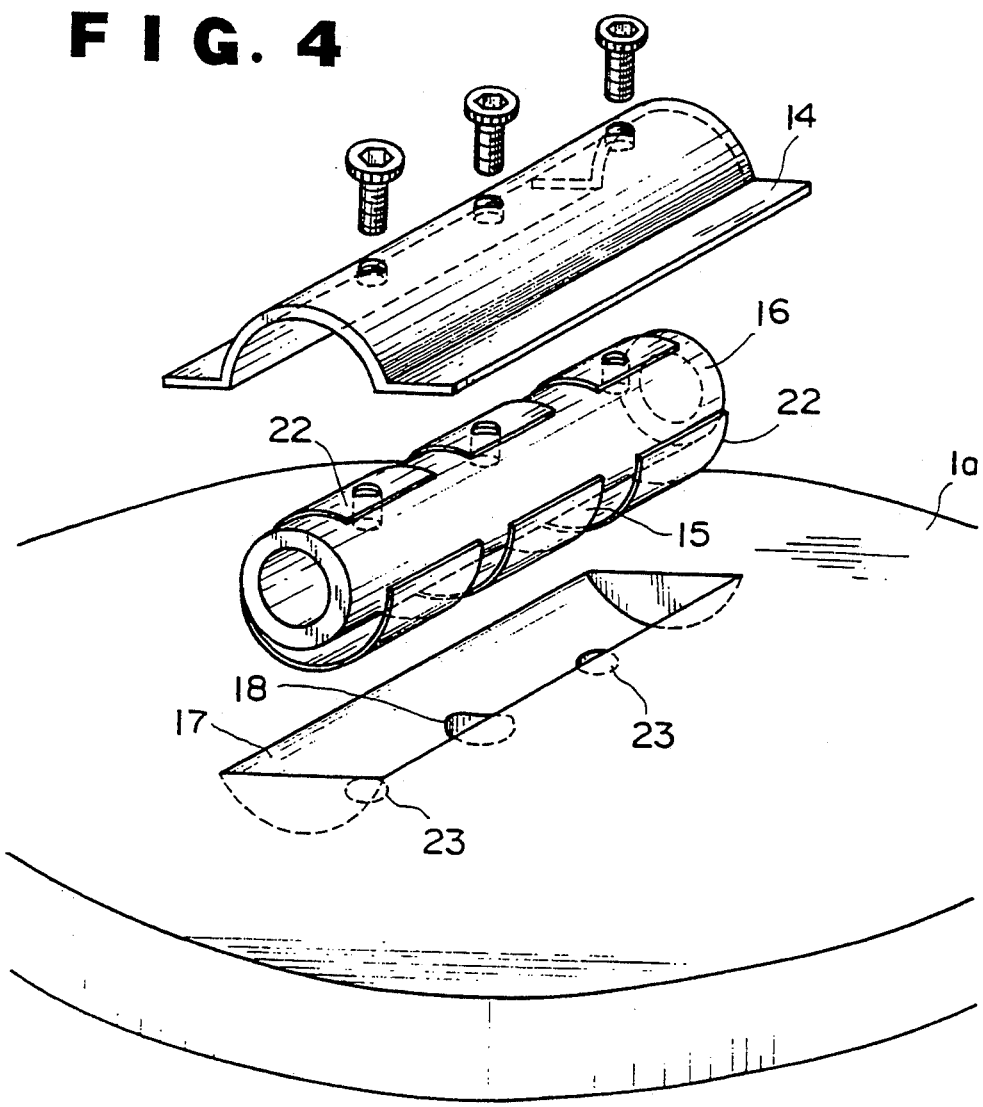
FIG. 4 is an exploded perspective view of an essential portion of a delivery valve in a second embodiment according to the present invention incorporated into a scroll compressor.

A delivery valve in a second embodiment according to the present invention will be described hereinafter with reference to FIG. 4.

Figure 7:
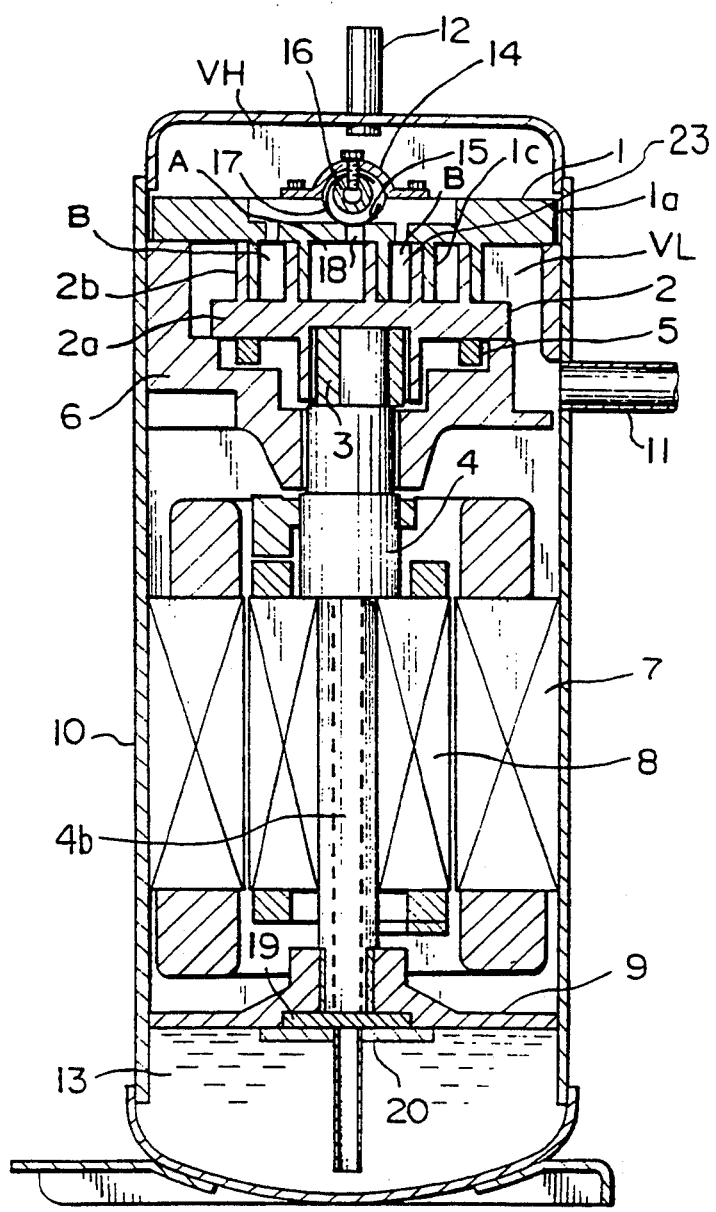
FIG. 7 is a sectional view of a scroll compressor showing the relief holes and discharge port in communication with respective chambers of the scroll compressor.

The delivery valve in the second embodiment is substantially the same in construction as the delivery valve in the first embodiment, except that the delivery valve in the second embodiment is provided with a stationary disk having a concave cylindrical valve element seating surface provided with a discharge port 18, and two relief holes 23 to allow the liquid refrigerant to escape from the compression chamber on the opposite sides of the discharge hole 18. The second compression chamber B (FIG. 1) formed outside the first compression chamber A communicates with the high-pressure chamber VH by means of the relief holes 23 (FIG. 7). The relief holes 23 are opened or closed individually by relief valve elements 22, respectively.

The relief valve elements 22 are lifted up to avoid the compression of the liquid refrigerant. The relief valve elements 22, similarly to the discharge valve element 15, are formed by curving plate springs or the like in a cylindrical shape. The discharge valve element 15 and the relief valve elements 22, similarly to the discharge valve element 15 of the delivery valve in the first embodiment, are fastened together with a cylindrical valve element holding member 16 to a cover member 14.

The compression of the liquid refrigerant occurs when starting the scroll compressor with the liquid refrigerant staying within the scroll compressor or when the liquid refrigerant flows reverse through the inlet pipe 11 into the compression chamber. When the liquid refrigerant is compressed, the pressure within the compression chambers A and B increases extremely, which is possible to break the respective scroll wraps 1c and 2b of the stationary scroll plate 1 and the revolving scroll plate 2.

The relief valve elements 22 and the relief holes 23 allow the liquid refrigerant to escape from the second compression chambers B formed outside the first compression chamber A into the high-pressure chamber VH to protect the scroll wraps 1c and 2b from breakage. The relief holes 23 are formed only at positions corresponding to the second compression chambers B for the following reasons. The compressed liquid refrigerant lifts up the discharge valve element 15 and is able to escape from the first compression chamber A through the discharge port 18 into the high-pressure chamber VH, the compressed liquid refrigerant is able to escape from the third compression chamber formed outside the second compression chamber B and contiguous with a circular valve seal through a clearance not sealed by the valve seal, and the compressed liquid refrigerant compressed in the second compression chambers B is unable to escape from the compression chambers B.

Since the stationary scroll plate is provided with the concave cylindrical valve element seating surface and the discharge valve element for opening or closing the discharge port opening in the valve element seating surface is formed in a cylindrical shape conforming to the shape of the valve element seating surface, the valve element seating surface can be easily formed at a low cost by cutting the stationary scroll plate with a cylindrical cutter, the top clearance can be reduced without reducing the rigidity of the stationary scroll plate, the recompression loss can be reduced and the delivery value has high efficiency and reliability.

Furthermore, the relief holes formed, in addition to the discharge port, in the valve element seating surface so as to be opened or closed by the relief valve elements allows the liquid refrigerant to escape from the compression chambers when the pressure in the compression chambers increases beyond a predetermined pressure, which prevents the breakage of the scroll wraps forming the compression chambers by the liquid refrigerant.

What is claimed is:

1. In a scroll compressor which includes a stationary scroll plate provided with a scroll wrap, and a revolving scroll plate provided with a scroll wrap and disposed so that the scroll wrap of the stationary scroll plate and that of the revolving scroll plate engage, the scroll compressor further including a delivery valve, the scroll compressor comprising:

the stationary scroll plate including a stationary disk provided with a valve element seating surface formed in the upper surface thereof, and a discharge port formed therethrough so as to open in the valve element seating surface;

a discharge valve element for opening or closing the discharge port, seated on the valve element seating surface of the stationary disk of the stationary scroll plate; and a valve element holding member holding the discharge valve element and limiting the lift of the discharge valve element;

wherein the valve element seating surface has a concave cylindrical shape, and the discharge valve element has a cylindrical shape conforming to the concave cylindrical shape of the valve element seating surface, and wherein said discharge valve element includes a first fixed end and a second free end such that said discharge valve element has a cantilever mount, and wherein said discharge valve element extends partially about said valve element holding member such that at least part of said valve element holding member is disposed radially inside of said cylindrical shape of said discharge valve element.

2. The scroll compressor of claim 1, wherein said discharge valve element and said valve element holding member are attached to a cover member covering the valve element seating surface.

3. The scroll compressor of claim 1 or 2, wherein said valve element holding member has a cylindrical shape.

4. In a scroll compressor which includes a stationary scroll plate provided with a scroll wrap, and a revolving scroll plate provided with a scroll wrap and disposed so that the scroll wrap of the stationary scroll plate and that of the revolving scroll plate engage so as to form compression chambers therebetween, the scroll compressor further including a delivery valve, the scroll compressor comprising:

the stationary scroll plate including a stationary disk providing with a valve element seating surface in the upper surface thereof, a discharge port formed therethrough so as to open in the valve element seating surface, and relief holes formed therethrough at positions on the opposite sides of the discharge port so as to open in the valve element seating surface and so as to open into compression chambers other than a compression chamber into which the discharge port opens;

a discharge valve element for opening or closing the discharge port, seated on the valve element seating surface of the stationary disk of the stationary scroll plate;

relief valve elements for individually opening or closing the relief holes, seated on the valve element seating surface of the stationary disk of the stationary scroll plate; and a valve element holding member holding the discharge valve element and the relief valve elements;

wherein the valve element seating surface has a concave cylindrical shape, the discharge valve element and the relief valve elements have a cylindrical shape conforming to the concave cylindrical shape of the valve element seating surface, and wherein at least one element of the discharge valve element and the relief valve elements includes a first fixed end and a second free end such that said at least one element has a cantilever mount, and wherein said at least one element extends partially about said valve element holding member.

5. The scroll compressor of claim 4, wherein the compression chamber into which the discharge port opens is a first compression chamber formed in a region corresponding to the central portion of the stationary disk of the stationary scroll plate, and the compression chambers into which said relief holes open are second compression chambers formed outside of the first compression chamber.

6. The scroll compressor of claim 1, wherein said valve element holding member includes a tubular member, and wherein said first fixed end of said discharge valve element is connected to said tubular member.

7. The scroll compressor of claim 4, wherein each of the discharge valve element and the relief valve elements have a cantilever mount.

8. The scroll compressor of claim 7, wherein the valve element holding member includes a tubular member, and wherein a first end of each of said discharge valve element and said relief valve elements is connected to said tubular member.

9. The scroll compressor of claim 1, wherein said valve element holding member is in the form of a rod having a curved outer surface.

10. The scroll compressor of claim 4, wherein said valve element holding member is in the form of a rod having a curved outer surface.

* * * * *